(12) United States Patent
Lorey

(10) Patent No.: US 10,384,568 B2
(45) Date of Patent: Aug. 20, 2019

(54) VEHICLE SEAT COMPRISING A GUIDE DEVICE

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 16/191,744

(22) Filed: Nov. 15, 2018

(65) Prior Publication Data

US 2019/0143850 A1    May 16, 2019

(30) Foreign Application Priority Data

Nov. 16, 2017   (DE) .......................... 10 2017 126 944

(51) Int. Cl.
*B60N 2/16* (2006.01)
*B60N 2/50* (2006.01)

(52) U.S. Cl.
CPC ......... *B60N 2/1615* (2013.01); *B60N 2/1665* (2013.01); *B60N 2/502* (2013.01); *B60N 2/507* (2013.01)

(58) Field of Classification Search
CPC .... B60N 2/1615; B60N 2/1605; B60N 2/162; B60N 2/1695; B60N 2/1807;
(Continued)

(56) References Cited

U.S. PATENT DOCUMENTS 3,037,735 A * 6/1962 Matthews .............. B60N 2/045
                                                      248/394
3,788,697 A * 1/1974 Barton ................... B60N 2/502
                                                      248/585
(Continued)

FOREIGN PATENT DOCUMENTS

DE         2527047       1/1977
WO     WO 02/20303       3/2002

OTHER PUBLICATIONS

Official Action for German Patent Application No. 102017126944.4, dated Jul. 12, 2018, 3 pages.
(Continued)

*Primary Examiner* — Philip F Gabler
(74) *Attorney, Agent, or Firm* — Sheridan Ross P.C.

(57) ABSTRACT

Vehicle seat comprising a vehicle seat top part, a vehicle seat bottom part and a guide device for guiding the vehicle seat top part with respect to the vehicle seat bottom part when the vehicle seat top part is deflected relative to the vehicle seat bottom part.

The guide device includes a first assembly having a first lever element, a second lever element and a lever element connector. The first lever element and the second lever element are arranged so as to extend forwards in a longitudinal direction.

The guide device also includes a second assembly having a third lever element, a fourth lever element and the lever element connector. The third lever element and the fourth lever element are arranged so as to extend backwards in a longitudinal direction.

The guide device further includes a stabilization device having a fifth lever element, a sixth lever element and a seventh lever element, which are pivotally connected by means of a shared pivot axis. The fifth lever element is pivotally connected to the vehicle seat top part, the sixth lever element is pivotally connected to the vehicle seat bottom part and the seventh lever element is pivotally connected to the lever element connector.

10 Claims, 12 Drawing Sheets

(58) Field of Classification Search
CPC .... B60N 2/1814; B60N 2/1817; B60N 2/502; B60N 2/507; B60N 2/508
See application file for complete search history.

(56) References Cited

U.S. PATENT DOCUMENTS

| | | | | | |
|---|---|---|---|---|---|
| 3,908,953 | A * | 9/1975 | Miller | ................... | B60N 2/502 248/421 |
| 4,926,760 | A * | 5/1990 | Sack | ................... | B65G 1/07 108/145 |
| 5,285,992 | A * | 2/1994 | Brown | ................. | B66F 7/0608 108/147 |
| 5,529,364 | A * | 6/1996 | Vilsmeier | ............. | B60N 2/045 248/421 |
| 5,651,585 | A * | 7/1997 | Van Duser | ............ | B60N 2/502 248/585 |
| 6,336,627 | B1 * | 1/2002 | Fujita | ................... | B60N 2/502 248/581 |
| 6,347,778 | B1 * | 2/2002 | Koga | ................... | B60N 2/1615 248/421 |
| 7,134,721 | B2 * | 11/2006 | Robinson | ............... | B60N 2/501 297/284.3 |
| 7,140,682 | B2 * | 11/2006 | Jaeger | ................. | B60N 2/0224 297/330 |
| 7,240,965 | B2 * | 7/2007 | Messerschmidt | ........ | B60N 2/06 297/344.15 |
| 7,300,107 | B2 * | 11/2007 | Kammerer | ........... | B60N 2/0292 296/65.01 |
| 8,047,596 | B2 * | 11/2011 | Jungert | ................ | B60N 2/0232 296/65.09 |
| 8,616,636 | B2 * | 12/2013 | Arata | .................... | B60N 2/165 297/216.1 |
| 8,616,645 | B2 * | 12/2013 | Ito | ........................ | B60N 2/1615 297/344.15 |
| 8,690,114 | B2 * | 4/2014 | Boyarski | ................ | A01D 67/04 248/421 |
| 8,714,642 | B2 * | 5/2014 | Lamparter | ............... | B60N 2/24 297/216.1 |
| 9,055,819 | B2 * | 6/2015 | Romera Carrion | ...... | A47C 3/20 |
| 2011/0241391 | A1 | 10/2011 | Lamparter et al. | | |
| 2013/0069405 | A1 * | 3/2013 | Schehl | ................... | B60N 2/161 297/313 |
| 2018/0251053 | A1 * | 9/2018 | Kemp | .................... | B60N 2/502 |

OTHER PUBLICATIONS

Extended Search Report for European Patent Application No. 18201430.8, dated Apr. 25, 2019, 3 pages.

* cited by examiner

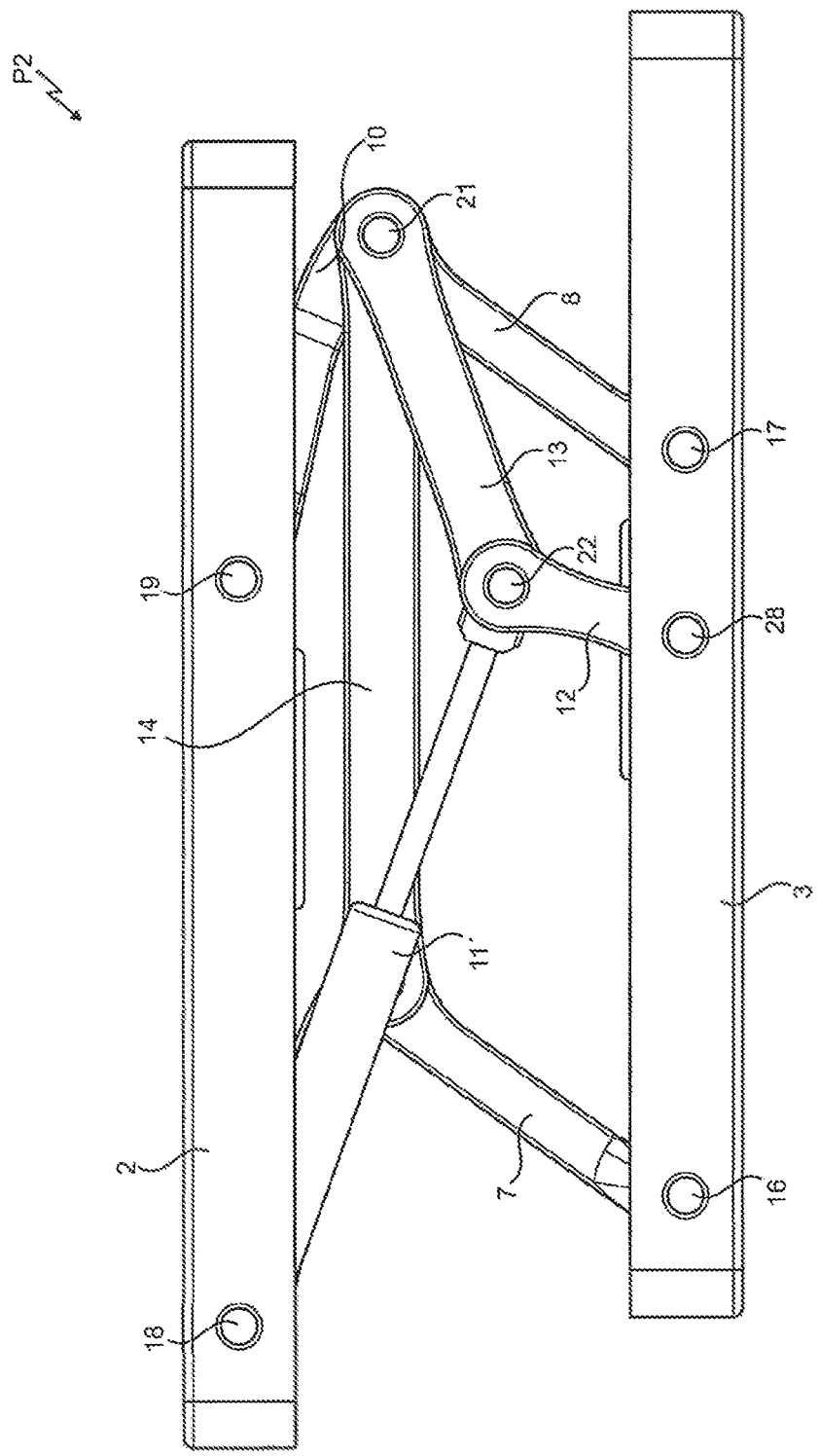

VEHICLE SEAT COMPRISING A GUIDE DEVICE

CROSS REFERENCE TO RELATED APPLICATIONS

This application claims the benefit of German Application No. DE 10 2017 126 944.4 filed Nov. 16, 2017, the disclosure of which is incorporated herein by reference.

FIELD

The invention relates to a vehicle seat comprising a vehicle seat top part, a vehicle seat bottom part and a guide device for guiding the vehicle seat top part with respect to the vehicle seat bottom part when the vehicle seat top part is deflected relative to the vehicle seat top part.

BACKGROUND

Numerous such guide devices are known from the prior art, for example a guide device in the shape of a parallelogram, as used in what are known as parallelogram suspension systems for vehicle seats.

Parallelogram suspension systems are vertical suspension systems in which, when the vehicle seat top part is spring-mounted vertically, a forward or backward displacement also occurs; which is, however, only desirable under certain conditions.

SUMMARY

Against this background, the object of the invention is to provide a vehicle seat comprising a guide device, that further develops the parallelogram suspension systems known hitherto and allows for a forward or backward displacement under certain conditions.

A key concept of the invention involves providing a vehicle seat comprising a vehicle seat top part, a vehicle seat bottom part and a guide device for guiding the vehicle seat top part with respect to the vehicle seat bottom part when the vehicle seat top part is deflected relative to the vehicle seat bottom part,
the guide device comprising:
   a first assembly having a first lever element, a second lever element and a lever element connector, the first lever element and the second lever element being arranged so as to extend forwards in a longitudinal direction;
   a second assembly having a third lever element, a fourth lever element and the lever element connector, the third lever element and the fourth lever element being arranged so as to extend backwards in a longitudinal direction;
   a stabilization device having a fifth lever element, a sixth lever element and a seventh lever element, which are pivotally connected by means of a shared pivot axis;
the fifth lever element being pivotally connected to the vehicle seat top part, the sixth lever element being pivotally connected to the vehicle seat bottom part and the seventh lever element being pivotally connected to the lever element connector.

According to the invention, the guide device comprises a first assembly and a second assembly, the respective lever elements being arranged so as to extend either forwards or backwards. One of the assemblies is thus similar to the parallelogram arrangement known hitherto.

Since the lever elements of the first assembly extend differently from the lever elements of the second assembly, the backward or forward displacement of the vehicle seat top part is balanced out and the guide device only allows the vehicle seat top part to move in the vertical direction.

However, since a guide device having the first assembly and the second assembly would be underdetermined per se, it is necessary to provide a stabilization device, as described according to the invention.

Since the vehicle seat top part should be moved relative to the vehicle seat bottom part by means of the guide device, it is necessary for the stabilization device to be connected to each of these elements, i.e. to the vehicle seat top part, to the vehicle seat bottom part and to the guide device.

According to the invention, therefore, the guide device comprises three lever elements arranged accordingly.

According to a preferred embodiment, the first lever element is pivotally connected to the vehicle seat bottom part by means of a first pivot axis and the second lever element is pivotally connected to said vehicle seat bottom part by means of a second pivot axis, and the third lever element is pivotally connected to the vehicle seat top part by means of a third pivot axis and the fourth lever element is pivotally connected to said vehicle seat top part by means of a fourth pivot axis.

According to another preferred embodiment, the second lever element, the fourth lever element and the lever element connector are pivotally connected by means of a sixth pivot axis, and the first lever element, the third lever element and the lever element connector are pivotally connected by means of a fifth pivot axis, the seventh lever element being pivotally arranged on the sixth pivot axis.

In general, the lever element connector can be considered as a component of the first assembly and the second assembly. An element of this kind is necessary since the lever element connector for the first assembly and second assembly virtually takes on the role of the vehicle seat top part or vehicle seat bottom part.

According to the embodiment outlined above, it follows that the lever element connector is pivotally connected to both the lever elements of the first assembly and to the lever elements of the second assembly.

Therefore, it is also provided that the stabilization device has to be pivotally connected to the lever element connector.

According to another preferred embodiment, the fifth element is pivotally connected to the vehicle seat top part by means of the third pivot axis. The arrangement of the stabilization device is thus described in more detail.

According to another preferred embodiment, the arrangement of the stabilization device can be described in even more detail in that the sixth lever element is pivotally connected to the vehicle seat bottom part by means of a seventh pivot axis.

According to another preferred embodiment, a suspension unit is provided to absorb the deflection of the vehicle seat top part, which is preferably connected to both the vehicle seat top part and the vehicle seat bottom part.

Likewise, it is also conceivable for a damping unit to be provided for damping the deflection of the vehicle seat top part.

In principle, different positions of the vehicle seat should also be assumed; in particular, there is a non-deflected position and a deflected position. A non-deflected position should be understood as a position of the guide device in which no external force is acting on the guide device or vehicle seat, i.e. the vehicle seat top part is not being deflected. Accordingly, a deflected position should be understood to be a position of the guide device in which the vehicle seat top part has been deflected with respect to the vehicle seat bottom part.

In addition, particular attention should be paid to the maximum or minimum deflection of the vehicle seat top part relative to the vehicle seat bottom part, wherein these positions can also be referred to as the maximum deflection position and minimum deflection position.

According to a preferred embodiment, when the vehicle seat top part is in the non-deflected position, the third pivot axis is arranged above the first pivot axis and the fourth pivot axis is arranged above the second pivot axis when viewed in a height direction.

In particular, the distance between the first pivot axis and the third pivot axis is equal to the distance between the second pivot axis and the fourth pivot axis, in the non-deflected position.

According to another preferred embodiment, the seventh pivot axis is arranged between the first pivot axis and the second pivot axis when viewed in the longitudinal direction.

This makes it possible to reduce the lengths of the lever elements of the stabilization device, in particular the lengths between the respective pivot axes of the lever elements.

According to one embodiment, it is particularly preferable for the lever element connector to be designed such that the length of the lever element connector can be changed by the deflection of the vehicle seat top part.

By means of such a design, the guidance by the guide device is changed such that not only is a vertical movement now possible, but also the vehicle seat top part is rotated simultaneously such that the vehicle seat top part and vehicle seat bottom part form an angle of less than 180° to one another. Therefore, two-dimensional suspension can be achieved: one suspension in the vertical direction and longitudinal horizontal suspension having a rotational effect.

According to an alternative embodiment, it is preferable for the fifth lever element to be designed such that the length of the fifth lever element can be changed by the deflection of the vehicle seat top part.

By means of this alternative embodiment, the vehicle seat top part is displaced in the longitudinal direction. Therefore, two-dimensional suspension can likewise be achieved: one suspension in the vertical direction and longitudinal horizontal suspension having a translational effect.

For example, the lever element connector or the fifth lever element can be formed as a damper element.

BRIEF DESCRIPTION OF THE DRAWINGS

Additional aims, features and possible applications of the present invention are set out in the accompanying description of embodiments on the basis of the drawings. All the features described and/or depicted therein form the subject matter of the present invention, either in isolation or in any reasonable combination, regardless of how they are summarized in the claims or their dependencies. In the drawings:

FIG. 6B shows the guide device according to FIG. 6A in a maximum deflected position;

DETAILED DESCRIPTION

Figure 1:
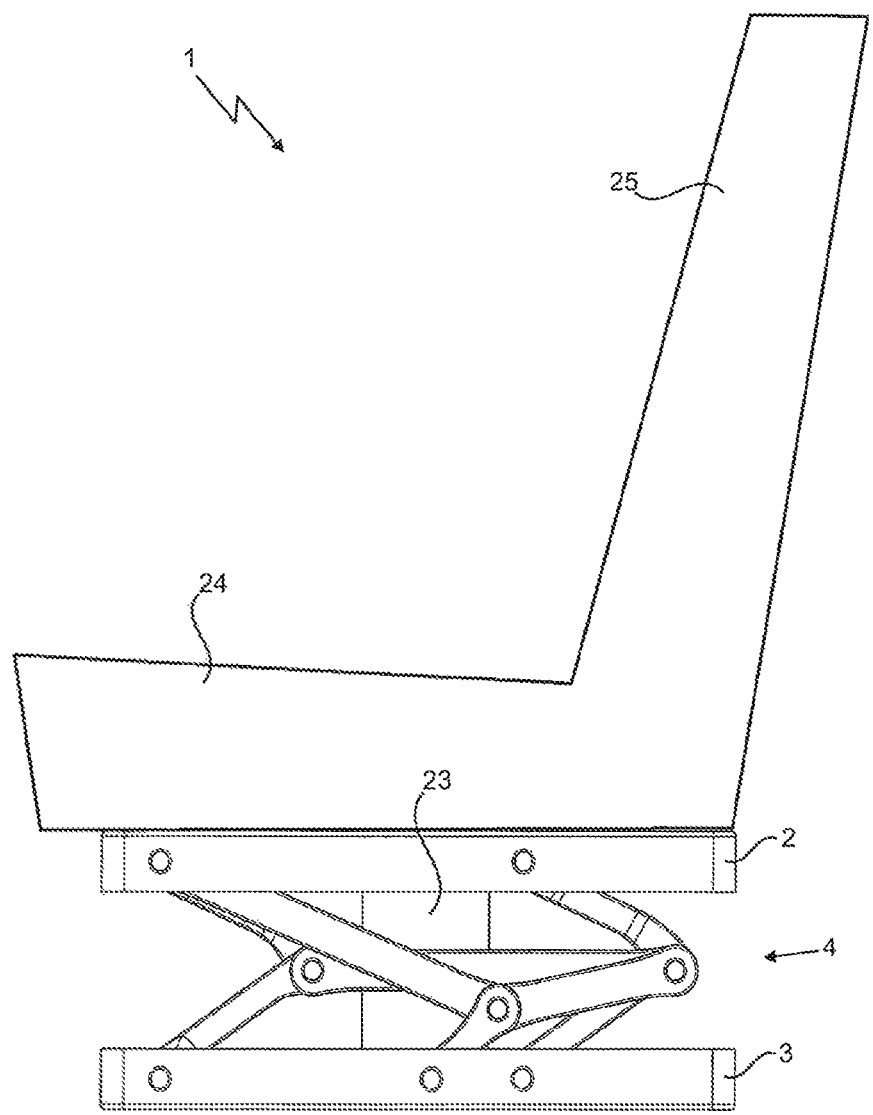
FIG. 1 shows a vehicle seat comprising a guide device.

FIG. 1 shows a vehicle seat 1 comprising a vehicle seat top part 2 and a vehicle seat bottom part 3, wherein a seat part 24 and a backrest 25 connected to the seat part 24 are arranged on the vehicle seat top part 2.

A guide device 4 connected to the vehicle seat top part 2 and the vehicle seat bottom part 3 can also be seen; more preferably, a suspension unit 23, which is also connected to the vehicle seat top part 2 and vehicle seat bottom part 3, can likewise be seen.

The specific design of the guide device 4 will be discussed in more detail in the subsequent figures.

Figure 2A:
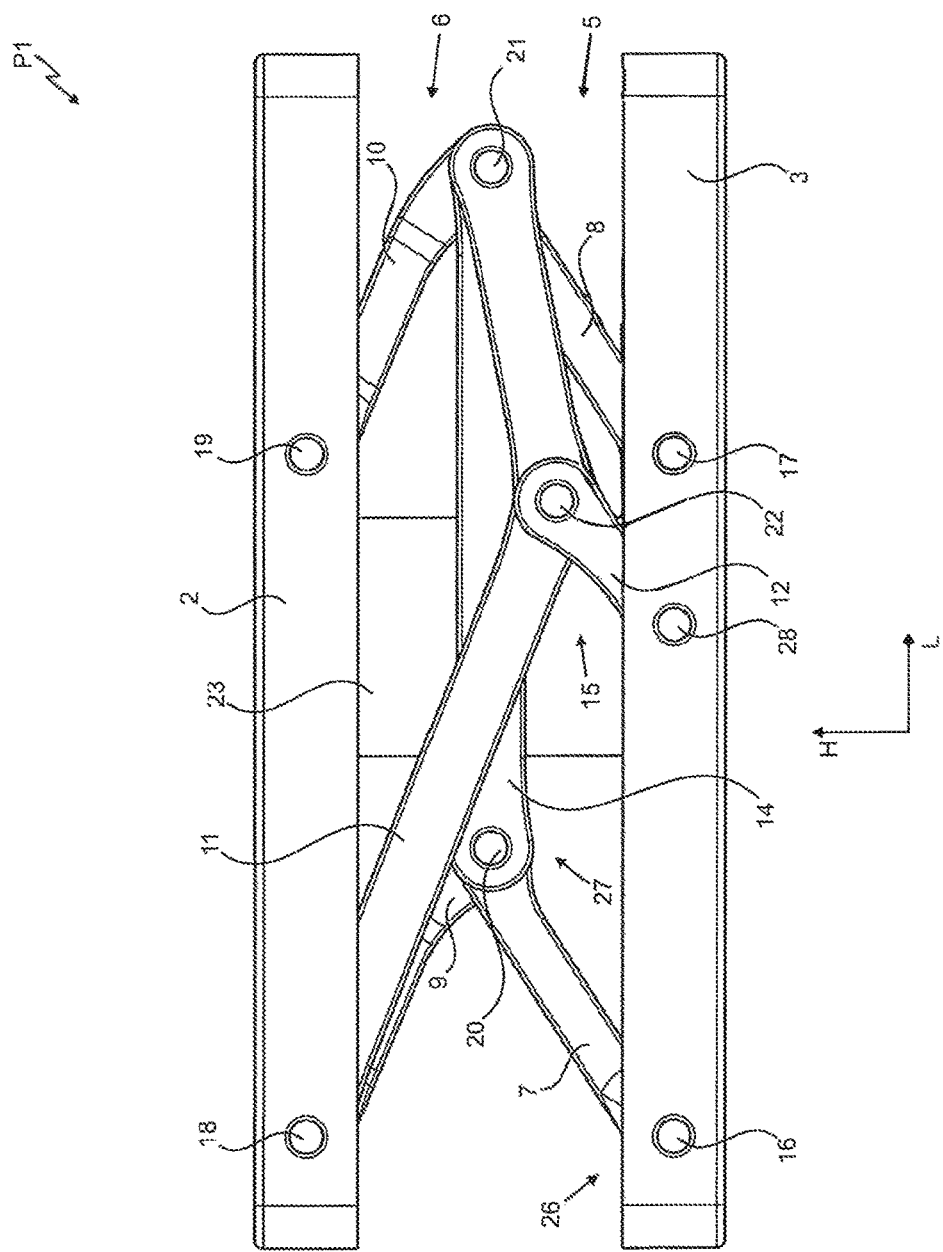
FIG. 2A shows a guide device according to one embodiment in a non-deflected position.
Figure 2B:
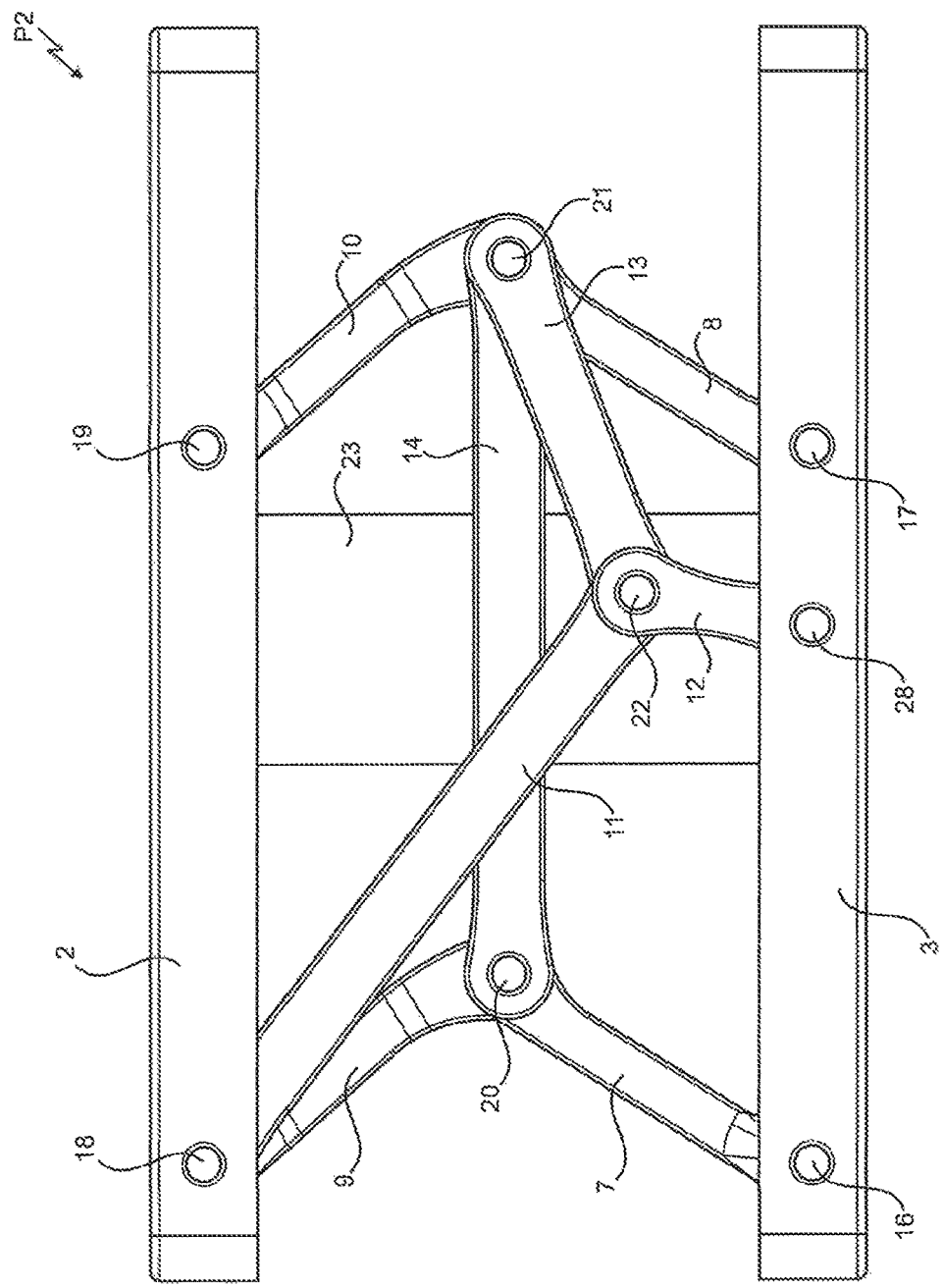
FIG. 2B shows the guide device according to FIG. 2A in a maximum deflected position.
Figure 2C:
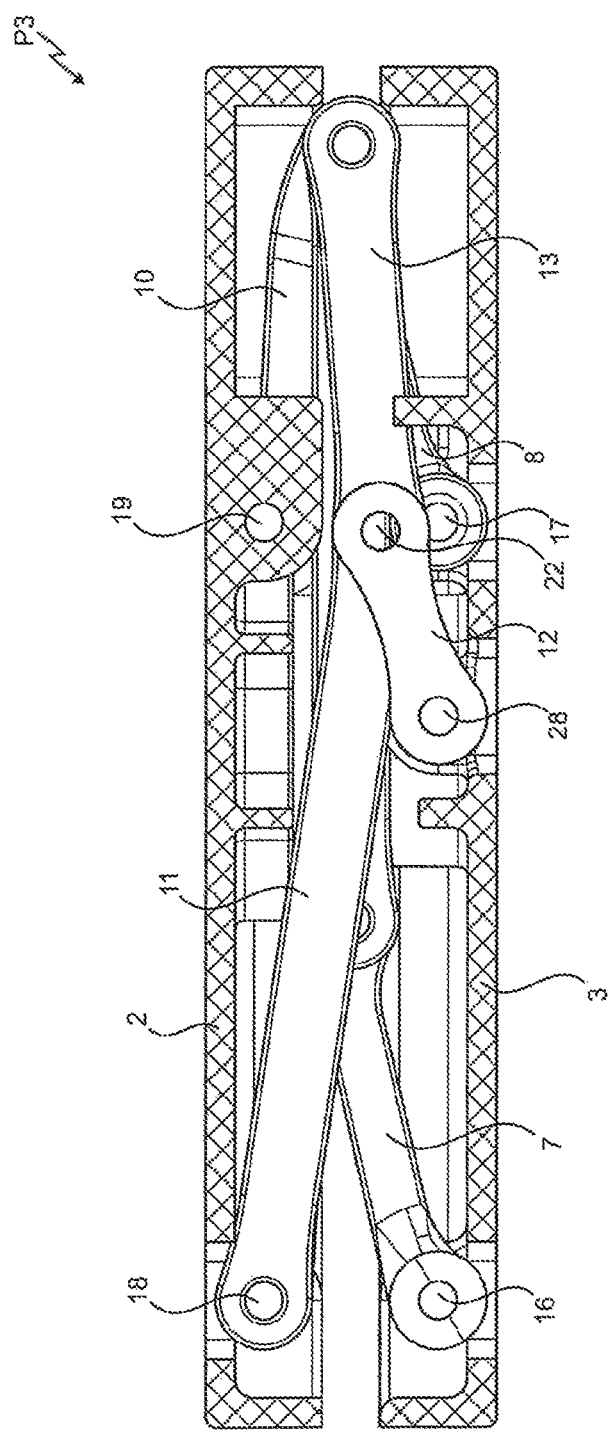
FIG. 2C shows the guide device according to FIG. 2A in a minimum deflected position.

In this respect, FIG. 2A to 2C schematically show the guide device 4 according to a first embodiment, FIG. 2A showing the guide device 4 in a non-deflected position P1, FIG. 2B showing a maximum deflected position P2 and FIG. 2C a minimum deflected position P3.

The first assembly 5 and the second assembly 6 can be seen in particular, the first assembly 5 comprising a first lever element 7 extending forwards in the longitudinal direction L, a second lever element 8 extending forwards in the longitudinal direction L, and a lever element connector 14, and the second assembly 6 comprising a third lever element 9 extending backwards in the longitudinal direction L and a third lever element 10 extending backwards in the longitudinal direction L.

In addition, a stabilization device 15 according to the invention can be seen, which comprises a fifth lever element 11, a sixth lever element 12 and a seventh lever element 13.

In this case, each lever element 7, 8, 9, 10, 11, 12, 13 comprises a first end region 26 and a second end region 27, each of these end regions 26, 27 being connected to an associated pivot axis, as can be seen in particular in the drawings. By way of example, the drawings only show the end regions 26, 27 for one lever element. In addition, the lever elements 7, 8, 9, 10, 11, 12, 13 are each formed elongately.

More specifically, the lever elements 7, 8, 9, 10, 11, 12, 13 are arranged as follows: the first lever element 7 is pivotally connected to the vehicle seat bottom part 3 by means of a first pivot axis 16 and the second lever element 8 is pivotally connected to said vehicle seat bottom part by means of a second pivot axis 17. In addition, the third lever element 9 is pivotally connected to the vehicle seat top part 2 by means of a third pivot axis 18 and the fourth lever element 10 is pivotally connected to said vehicle seat bottom part by means of a fourth pivot axis 19.

Additionally, the second lever element 8, the fourth lever element 10 and the lever element connector 14 are pivotally connected by means of a sixth pivot axis 21, wherein the first lever element 7, the third lever element 9 and the lever element connector 14 are pivotally connected by means of a fifth pivot axis 20.

Furthermore, the fifth lever element 11, sixth lever element 12 and seventh lever element 13 are pivotally interconnected by means of a shared pivot axis 22. Moreover, the sixth lever element 12 is pivotally connected to the vehicle seat bottom part by means of a seventh pivot axis 28.

The seventh lever element 13 is also pivotally arranged on the sixth pivot axis 21.

As can be seen in FIG. 2A, the guide device 4 is in the non-deflected position P1, i.e. no external force is acting on the vehicle seat 1 or vehicle seat top part 2 that would cause the vehicle seat top part 2 to be deflected with respect to the vehicle seat bottom part 3.

Preferably, the first lever element 7 and second lever element 8 are arranged so as to extend forwards in the longitudinal direction L and also in parallel with one another. In this respect, parallel should be understood to mean that the connecting line between the first pivot axis 16 and the fifth pivot axis, and the connecting line between the second pivot axis 17 and the sixth pivot axis 21 are parallel to one another. This also applies similarly to the third lever element 9 and the fourth lever element 10 for the corresponding pivot axes 18, 19, 20, 21.

Also preferably, the connecting line between the fifth pivot axis 20 and the sixth pivot axis 21 is parallel to the connecting line between the first pivot axis 16 and the second pivot axis 17 and to the connecting line between the third pivot axis 18 and the fourth pivot axis 19. This means that the lever element connector 14 is parallel to the vehicle seat top part 2 and the vehicle seat bottom part 3.

Particularly preferably, the first lever element 7, the second lever element 8, the third lever element 9 and the fourth lever element 10 are the same length, i.e. the lengths of the connecting lines between the respective pivot axes of the lever elements are the same.

It is also preferable for the connecting line between the third pivot axis 18 and shared pivot axis 22 to be the same length as the connecting line between the first pivot axis 16 and second pivot axis 17.

In this case, it is also advantageous for the connecting line between the shared pivot axis 22 and seventh pivot axis 28 to be the same length as the connecting line between the seventh pivot axis 28 and second pivot axis 17. Accordingly, the length of the connecting line between the shared pivot axis 22 and sixth pivot axis 21 is the same as the length of the connecting line of any one of the first, second, third or fourth lever elements.

The lengths of the connecting lines should be formed such that complete spring compression or minimum deflection is possible.

As a result, according to the embodiments of FIG. 2A-2C, in which the length of the lever elements 7, 8, 9, 10, 11, 12, 13 cannot be changed, i.e. the distance between the respective pivot axes of the lever elements cannot be changed, the vehicle seat top part 2 is guided relative to the vehicle seat bottom part 3 only in the vertical direction or in the height direction H. The advantages of a parallelogram suspension, in particular the small amount of space required, are however still retained.

To cushion the vehicle seat top part 2 when the vehicle seat top part 2 is deflected, a suspension unit 23 is also provided, which can be implemented for example as a pneumatic spring or a mechanical spring.

In particular, the third pivot axis 18 is arranged above the first pivot axis 16 and the fourth pivot axis 19 is arranged above the second pivot axis 17 when viewed in the height direction H; in particular wherein no forward or backward displacement in the longitudinal direction L is provided.

FIG. 2B shows the guide device 4 in a maximum deflected position P2, the elements having the same reference signs.

FIG. 2C shows the guide device 4 in a minimum deflected position P3 and in cross section for ease of illustration, the elements having the same reference signs here, too.

Figure 3:
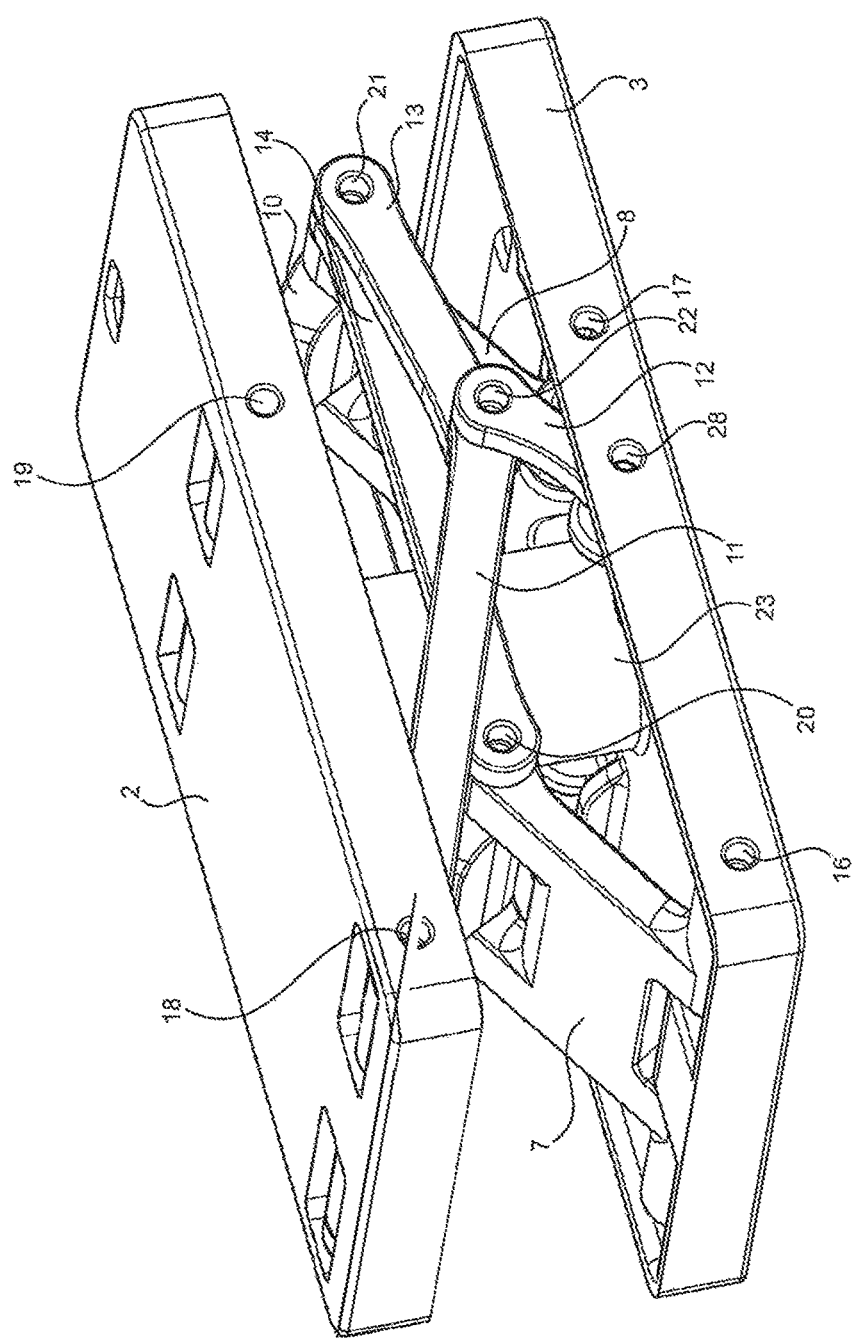
FIG. 3 is a perspective view of the guide device according to FIG. 2A.

FIG. 3 is a schematic and perspective view of the guide device 4 from FIG. 2A.

Figure 4:
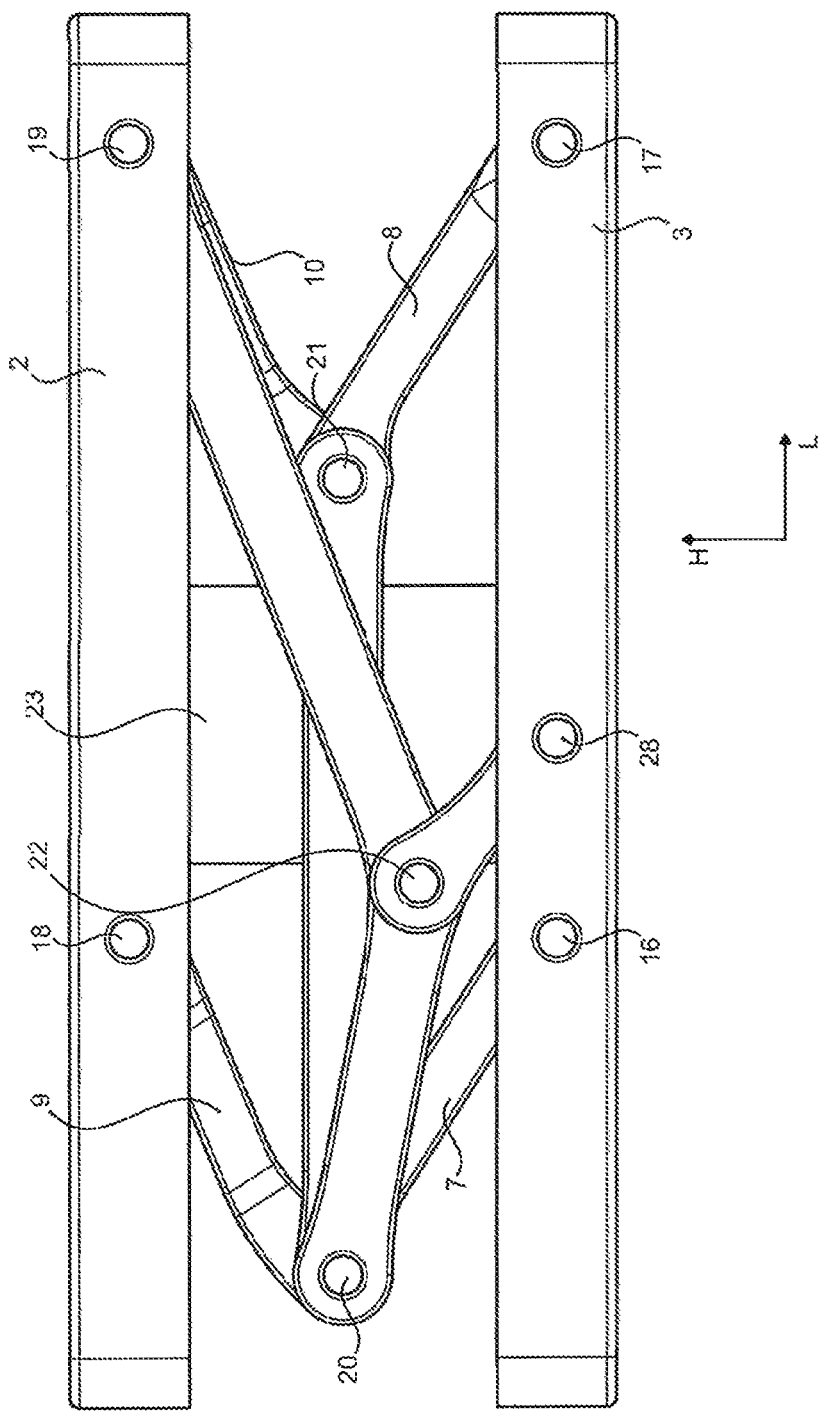
FIG. 4 shows another embodiment of the guide device.

FIG. 4 shows a guide device 4 having the same components as the guide device of FIG. 2A-2C, although the lever elements of the first assembly 5 and of the second assembly are oriented differently, i.e. the first lever element 7 and second lever element 8 are arranged so as to extend backwards in the longitudinal direction L and the third lever element 9 and fourth lever element 10 are arranged so as to extend forwards in the longitudinal direction L.

Figure 5A:
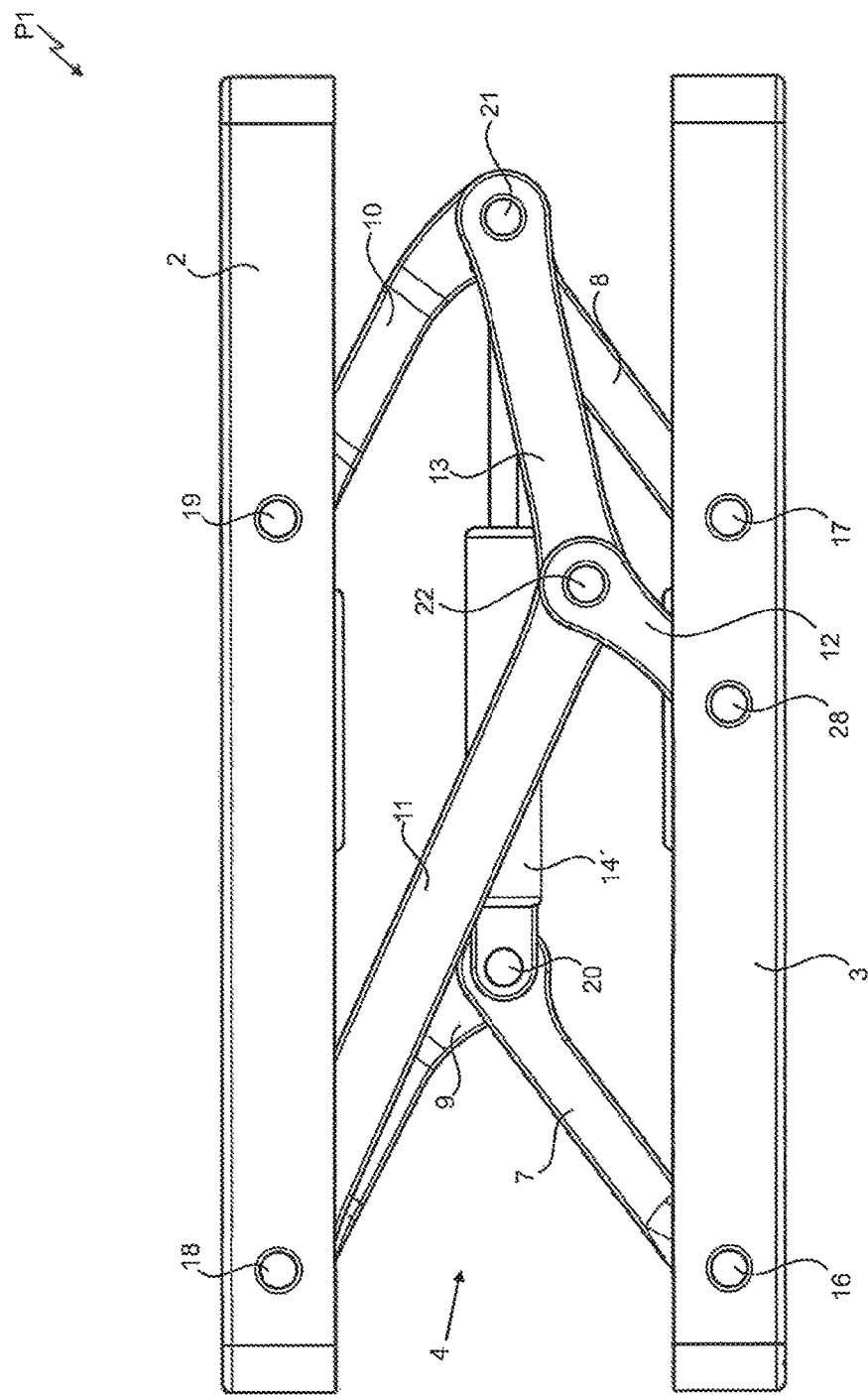
FIG. 5A shows a guide device according to another embodiment in a non-deflected position.
Figure 5B:
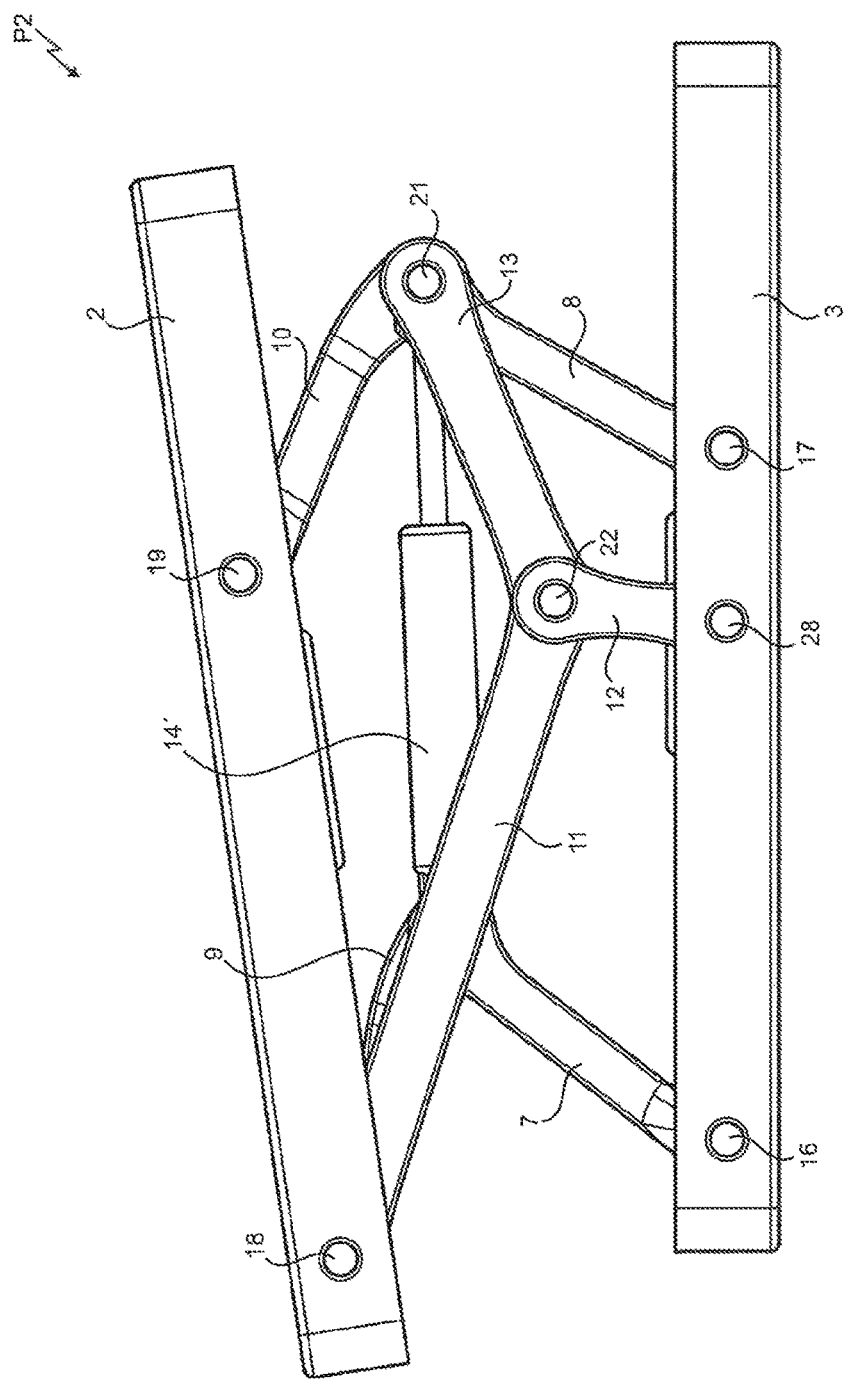
FIG. 5B shows the guide device according to FIG. 5A in a maximum deflected position.
Figure 5C:
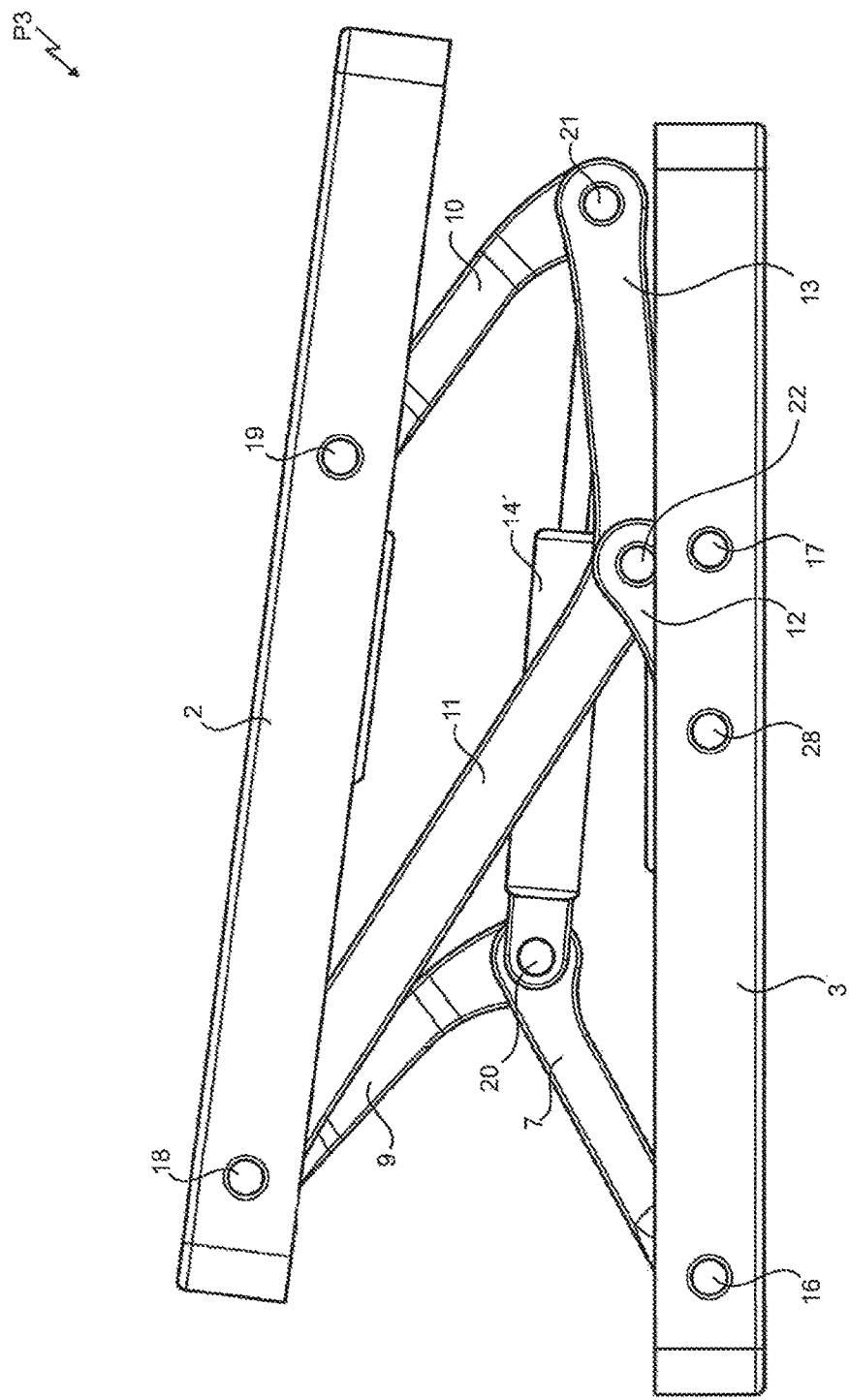
FIG. 5C shows the guide device according to FIG. 5C in a minimum deflected position.

FIG. 5A-5C show another embodiment of the present invention, specifically such that the lever element connector 14, the length of which could not be changed initially, has been replaced by a length-adjustable lever element connector 14'.

In particular, the adjustable lever element connector 14' may be formed as a damper element.

FIG. 5A again shows the guide device 4 in a non-deflected position P1, comprising the same elements as in the previous figures, although having the lever element connector 14 replaced by the adjustable lever element connector 14'.

FIG. 5B shows the guide device 4 in the maximum deflected position P2 and FIG. 5C shows the guide device 4 in the minimum deflected position P3.

Since the length of the lever element connector 14' is adjustable, a new situation is produced overall for the guidance of the vehicle seat top part 2 with respect to the vehicle seat bottom part 3 when the vehicle seat top part 2 is deflected.

In addition to the movement or suspension in the vertical direction or height direction H, the vehicle seat top part 2 is made to rotate by the length adjustment of the lever element connector 14', a length adjustment being equivalent to a change of the distance between the fifth pivot axis 20 and sixth pivot axis 21. As a result of this and the forced guidance by the stabilization device 15, different movements are produced within the guide device 4.

Accordingly, the rotation of the vehicle seat top part 2 also produces a forward or backward displacement in the longitudinal direction L, depending on the type of the movement or deflection of the vehicle seat top part 2.

Figure 6A:
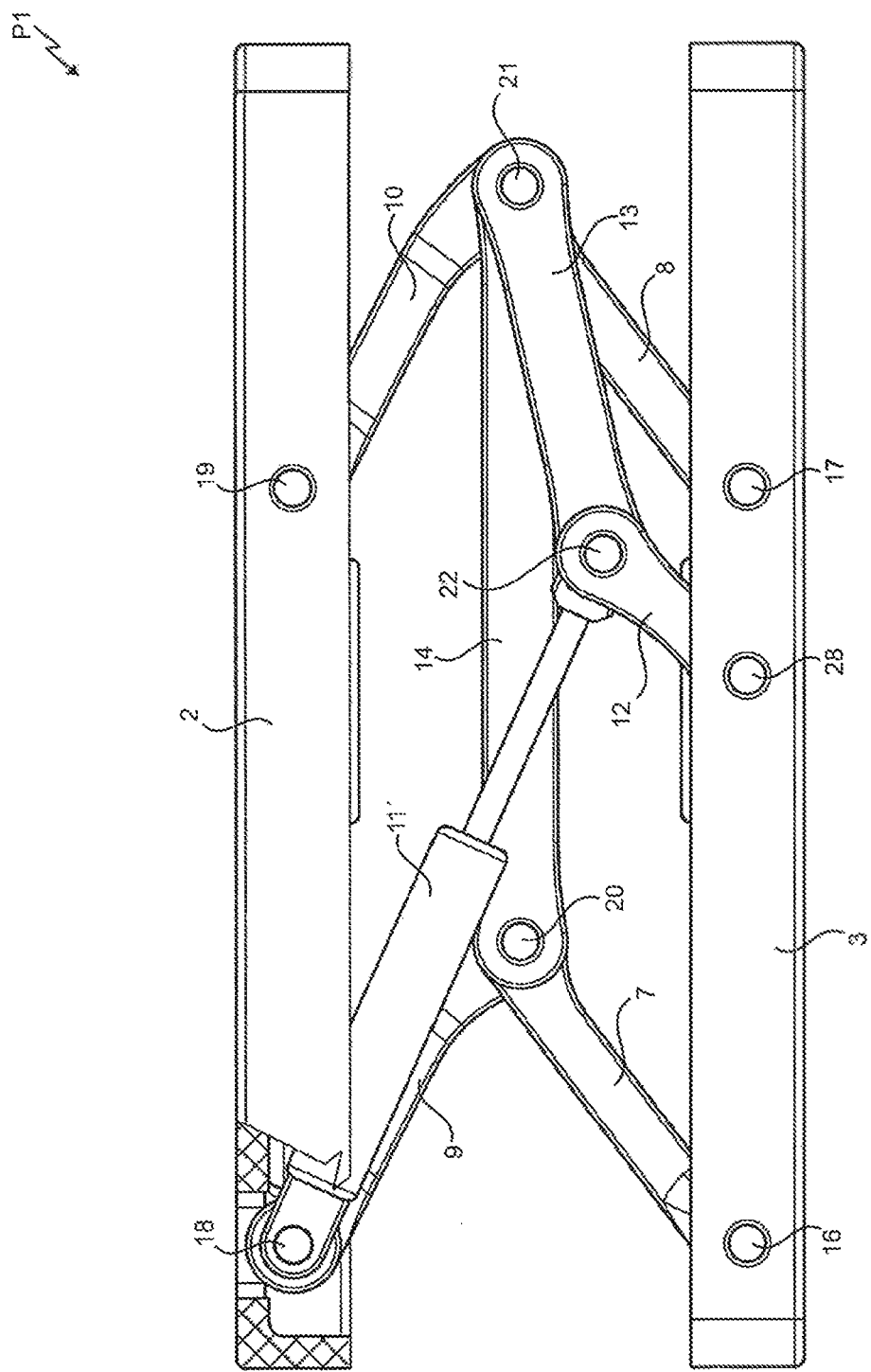
FIG. 6A shows a guide device according to another embodiment in a non-deflected position.
Figure 6C:
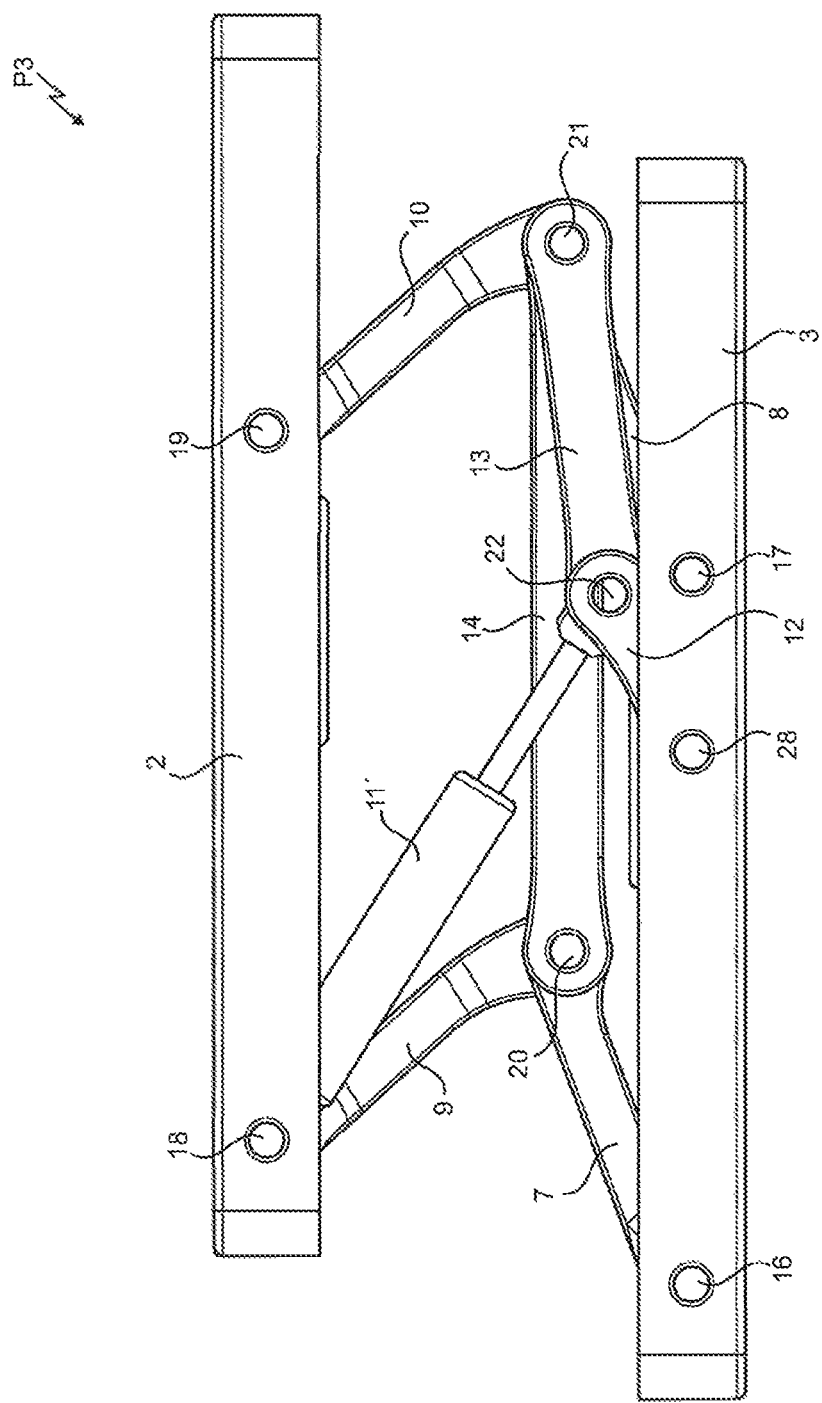
FIG. 6C shows the guide device according to FIG. 6A in a minimum deflected position.

FIG. 6A-6C show another embodiment, in which the fifth lever element 11, the length of which cannot be adjusted according to FIG. 2A-2C, has been replaced by a length-adjustable lever element 11'.

FIG. 6A shows the guide device in the non-deflected position P1, FIG. 6B shows said device in the maximum deflected position P2 and FIG. 6C shows said device in the minimum deflected position P3.

By replacing the fifth lever element 11, a different movement of the vehicle seat top part 2 can be seen compared with the replacement of the lever element connector 14. As can be seen in FIGS. 6B and 6C, in addition to movement in the vertical or the height direction H, a forward or backward displacement in the longitudinal direction L is generated, yet unlike in FIG. 5A-5C, the vehicle seat top part 2 is moved in translation rather than rotated.

Overall, by replacing the lever element connector 14 or the fifth lever element 11 by length-adjustable equivalents, a movement in the longitudinal direction L is produced in addition to the movement in the height direction H, so that longitudinal horizontal suspension can also be achieved when using suitable suspension elements or damping elements.

In general, it is also conceivable for the length of each lever element 7, 8, 9, 10, 11, 12, 13, the length of the lever element connector 14, and the distance between the pivot axes 16, 17 and pivot axes 18, 19 to be designed in an adjustable manner. Combinations of length-adjustable lever elements are also conceivable, for example the fifth lever element 12 and the lever element connector 14, or any other combination of the lever elements 7, 8, 9, 10, 11, 12, 13 and the lever element connector 14. It is also conceivable for the length of any other lever element to be designed in an adjustable manner instead of that of the fifth lever element 11.

All the features disclosed in the application documents are claimed as being essential to the invention wherever they are novel over the prior art when taken in isolation or in combination.

LIST OF REFERENCE SIGNS 1 vehicle seat
2 vehicle seat top part
3 vehicle seat bottom part
4 guide device
5 first assembly
6 second assembly
7 first lever element
8 second lever element
9 third lever element
10 fourth lever element
11 fifth lever element
11' length-adjustable fifth lever element
12 sixth lever element
13 seventh lever element
14 lever element connector
14' length-adjustable lever element connector
15 stabilization device
16 first pivot axis
17 second pivot axis
18 third pivot axis
19 fourth pivot axis
20 fifth pivot axis
21 sixth pivot axis
22 shared pivot axis
23 suspension unit
24 seat part
25 backrest
26 first end region
27 second end region
28 seventh pivot axis
P1 non-deflected position
P2 maximum deflected position
P3 minimum deflected position
B width direction
L longitudinal direction
H height direction

What is claimed is:

1. A vehicle seat comprising a vehicle seat top part, a vehicle seat bottom part and a guide device for guiding the vehicle seat top part with respect to the vehicle seat bottom part when the vehicle seat top part is deflected relative to the vehicle seat bottom part, wherein the guide device comprises:
    a first assembly having a first lever element, a second lever element and a lever element connector, the first lever element and the second lever element being arranged so as to extend forwards in a longitudinal direction;
    a second assembly having a third lever element, a fourth lever element and the lever element connector, the third lever element and the fourth lever element being arranged so as to extend backwards in a longitudinal direction;
    a stabilization device having a fifth lever element, a sixth lever element and a seventh lever element, which are pivotally connected by means of a shared pivot axis;
    the fifth lever element being pivotally connected to the vehicle seat top part, the sixth lever element being pivotally connected to the vehicle seat bottom part and the seventh lever element being pivotally connected to the lever element connector.

2. The vehicle seat according to claim 1, wherein the first lever element is pivotally connected to the vehicle seat bottom part by means of a first pivot axis and the second lever element is pivotally connected to said vehicle seat bottom part by means of a second pivot axis, and the third lever element is pivotally connected to the vehicle seat top part by means of a third pivot axis and the fourth lever element is pivotally connected to said vehicle seat top part by means of a fourth pivot axis.

3. The vehicle seat according to claim 2, wherein the fifth lever element is pivotally connected to the vehicle seat top part by means of the third pivot axis.

4. The vehicle seat according to claim 2, wherein when the vehicle seat top part is in a non-deflected position, the third pivot axis is arranged above the first pivot axis and the fourth pivot axis is arranged above the second pivot axis when viewed in a height direction.

5. The vehicle seat according to claim 1, wherein the first lever element, the third lever element and the lever element connector are pivotally connected by means of a fifth pivot axis, and the second lever element, the fourth lever element and the lever element connector are pivotally connected by means of a sixth pivot axis, and the seventh lever element being pivotally arranged by means of the sixth pivot axis.

6. The vehicle seat according to claim 1, wherein the sixth lever element is pivotally connected to the vehicle seat bottom part by means of a seventh pivot axis.

7. The vehicle seat according to claim 6, wherein when viewed in the longitudinal direction, the seventh pivot axis is arranged between the first pivot axis and the second pivot axis.

8. The vehicle seat according to claim 1, wherein a suspension unit is provided, which is connected to the vehicle seat top part and the vehicle seat bottom part.

9. The vehicle seat according to claim 1, wherein the lever element connector is designed such that the length of the lever element connector can be changed by the deflection of the vehicle seat top part.

10. The vehicle seat according to claim 1, wherein the fifth lever element is designed such that the length of the fifth lever element can be changed by the deflection of the vehicle seat top part.

* * * * *